(12) United States Patent
Suetsugu

(10) Patent No.: US 12,262,183 B2
(45) Date of Patent: Mar. 25, 2025

(54) SOUND GENERATION APPARATUS

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 226 days.

(21) Appl. No.: 18/155,473

(22) Filed: Jan. 17, 2023

(65) Prior Publication Data

US 2023/0247355 A1      Aug. 3, 2023

(30) Foreign Application Priority Data

Jan. 31, 2022   (JP) ................................ 2022-012960

(51) Int. Cl.
*H04R 3/00*     (2006.01)
*G06T 1/00*     (2006.01)
*H04R 1/40*     (2006.01)

(52) U.S. Cl.
CPC ........... *H04R 3/005* (2013.01); *G06T 1/0007* (2013.01); *H04R 1/406* (2013.01); *H04R 2430/21* (2013.01)

(58) Field of Classification Search
CPC ............ H04R 2430/21; H04R 2499/11; H04R 2499/15; H04R 3/00; H04R 3/005; H04R 1/406; G10K 11/175; G10K 11/1752; G10K 11/1754; G06T 1/0007
USPC ................................................... 381/92, 73.1
See application file for complete search history.

(56) References Cited

U.S. PATENT DOCUMENTS

| | | | |
|---|---|---|---|
| 8,892,228 B2 * | 11/2014 | Muesch ................ | G10L 19/005 704/226 |
| 10,096,311 B1 * | 10/2018 | Sarkar ...................... | H04K 3/84 |
| 2009/0097665 A1 * | 4/2009 | L'Esperance ...... | G10K 11/1752 381/57 |
| 2012/0316869 A1 * | 12/2012 | Xiang ..................... | H04M 9/08 704/226 |
| 2018/0151168 A1 * | 5/2018 | Benway ............. | G10K 11/1752 |
| 2020/0051586 A1 * | 2/2020 | Saito ................ | G10K 11/17857 |
| 2021/0400142 A1 * | 12/2021 | Jorasch ............... | H04L 65/1069 |

FOREIGN PATENT DOCUMENTS

| | | |
|---|---|---|
| JP | 2013-003269 A | 1/2013 |
| JP | 2017-184154 A | 10/2017 |

* cited by examiner

*Primary Examiner* — Ahmad F. Matar
*Assistant Examiner* — Sabrina Diaz
(74) *Attorney, Agent, or Firm* — MASUVALLEY & PARTNERS; Peter Martinez

(57) ABSTRACT

A sound generation apparatus includes sound collection means configured to collect a sound of a sound source in a space, image capture means configured to capture an image of the sound source, estimation means configured to estimate an attribute of the sound source from the image captured by the image capture means, sound generation means configured to obtain an acoustic characteristic of a target sound included in the sound collected by the sound collection means and to generate multiple masking sounds on the basis of the acoustic characteristic and the attribute of the sound source estimated by the estimation means, display means configured to display the attribute of the sound source estimated by the estimation means, sound selection means configured to receive selection of a masking sound from the masking sounds generated by the sound generation means, and sound output means configured to output the selected masking sound.

11 Claims, 7 Drawing Sheets

SOUND GENERATION APPARATUS

CROSS-REFERENCE TO RELATED APPLICATION

This application claims priority to Japanese Patent Application No. 2022-12960 filed on Jan. 31, 2022, which is hereby incorporated herein by reference in its entirety.

TECHNICAL FIELD

The present invention relates to a sound generation apparatus.

BACKGROUND ART

There is known a masking analysis apparatus that is intended to analyze masking of a target sound using a masker sound and includes autocorrelation calculation means configured to calculate the autocorrelation sequence of a line spectral train corresponding to each peak of the spectral of each of a first acoustic signal indicating the target sound and a second acoustic signal indicating a mixed sound of the target sound and a masker sound for each frame on the time axis and correlation matrix generation means configured to calculate, between any two bands on the frequency axis of each of the first and second acoustic signals, the time-series cross-correlation coefficient value of the auto-correlation value of each of the bands in an autocorrelation sequence and to generate an inter-band correlation matrix having the cross-correlation coefficient values as elements (Japanese Unexamined Patent Application Publication No. 2013-3269).

There is also known a sound collection/reproduction apparatus including sound collection means configured to be able to collect area sounds in divided areas in a space on the basis of input signals inputted from multiple microphone arrays disposed in the space, image capture region storage means configured to store information on an image capture region whose image is captured by a camera that captures an image of the inside of the space, sound collection target area setting means configured to set a region including a center area corresponding to the image capture region as a sound collection target area in the space, integration means configured to generate an acoustic signal by mixing area signals in the sound collection target area, and output means configured to provide an acoustic signal based on the acoustic signal generated by the integration means to an output unit that outputs a sound (Japanese Unexamined Patent Application Publication No. 2017-184154).

See Japanese Unexamined Patent Application Publication Nos. 2013-3269 and 2017-184154.

SUMMARY OF INVENTION

An object of the present invention is to allow a user to easily select a masking sound suitable for a particular sound source in a space and to use the most suitable masking sound.

To solve the above problems, a sound generation apparatus according to a first aspect of the present invention includes sound collection means configured to collect a sound of a sound source in a space, image capture means configured to capture an image of the sound source, estimation means configured to estimate an attribute of the sound source from the image captured by the image capture means, sound generation means configured to obtain an acoustic characteristic of a target sound included in the sound collected by the sound collection means and to generate multiple masking sounds on the basis of the acoustic characteristic and the attribute of the sound source estimated by the estimation means, display means configured to display the attribute of the sound source estimated by the estimation means, sound selection means configured to receive selection of a masking sound from the masking sounds generated by the sound generation means, and sound output means configured to output the selected masking sound.

According to a second aspect of the present invention, in the sound generation apparatus of the first aspect of the present invention, the sound generation means may analyze an acoustic characteristic of the sound of the sound source collected by the sound collection means and generate a masking sound having an acoustic characteristic similar to the acoustic characteristic of the sound of the sound source.

According to a third aspect of the present invention, in the sound generation apparatus of the first aspect of the present invention, the sound generation means may generate a masking sound having an acoustic characteristic similar to an acoustic characteristic of the attribute of the sound source estimated by the estimation means.

According to a fourth aspect of the present invention, in the sound generation apparatus of the third aspect of the present invention, the sound generation means may generate multiple masking sounds each having an acoustic characteristic similar to the acoustic characteristic of the attribute of the sound source.

According to a fifth aspect of the present invention, in the sound generation apparatus of the first aspect of the present invention, the sound selection means may display the attribute of the sound source estimated by the estimation means and receive selection of the masking sound.

According to a sixth aspect of the present invention, in the sound generation apparatus of the fifth aspect of the present invention, the display means may display the sound source using mixed reality including virtual reality, augmented reality, or a hologram.

According to a seventh aspect of the present invention, in the sound generation apparatus of any one of the first to sixth aspects of the present invention, the sound collection means may be an omnidirectional microphone.

According to an eighth aspect of the present invention, in the sound generation apparatus of the first or second aspect of the present invention, the sound of the sound source in the space may be a voice of a conversation of a user using the sound generation apparatus.

According to a ninth aspect of the present invention, in the sound generation apparatus of the eighth aspect of the present invention, the sound output means may output the masking sound as long as the sound collection means is collecting the sound of the sound source.

According to the first aspect of the present invention, a user is allowed to easily select a masking sound suitable for the particular sound source in the space and to use the most suitable masking sound.

According to the second aspect of the present invention, a masking sound suitable for the sound source is generated.

According to the third aspect of the present invention, the sound source is grasped using an image, and a masking sound suitable for the sound source is generated.

According to the fourth aspect of the present invention, selectable masking sounds are increased.

According to the fifth aspect of the present invention, displaying an image allows a user to easily select the most suitable masking sound.

According to the sixth aspect of the present invention, the sound source can be properly recognized.

According to the seventh aspect of the present invention, a sound in a space in which the sound is reflected can be collected.

According to the eighth aspect of the present invention, the content of the conversation is made less audible to third parties.

According to the eighth aspect of the present invention, the content of the conversation of a user is made less audible to third parties only when the user is having a conversation.

DESCRIPTION OF EMBODIMENTS

Figure 1:
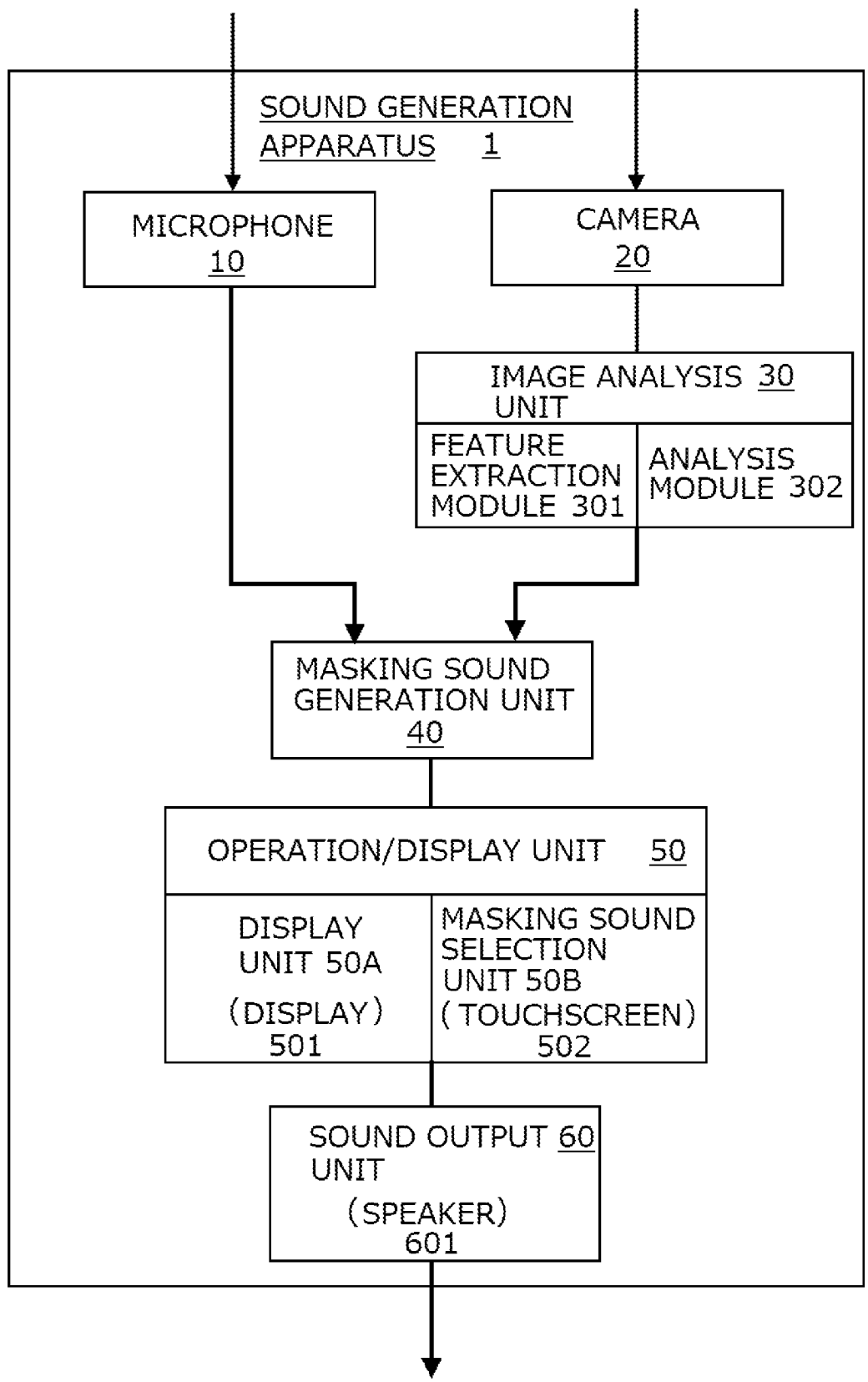
FIG. 1 a block diagram showing the block configuration of a sound generation apparatus according to the present embodiment.

Referring now to the drawings, an embodiment and specific examples of the present invention will be described in detail. However, the present invention is not limited to the embodiment or specific examples. Also, the drawings are schematic, and elements other than those required for the description are omitted therein as appropriate in order to clarify the description.

(1) Configuration of Sound Generation Apparatus

Figure 2:
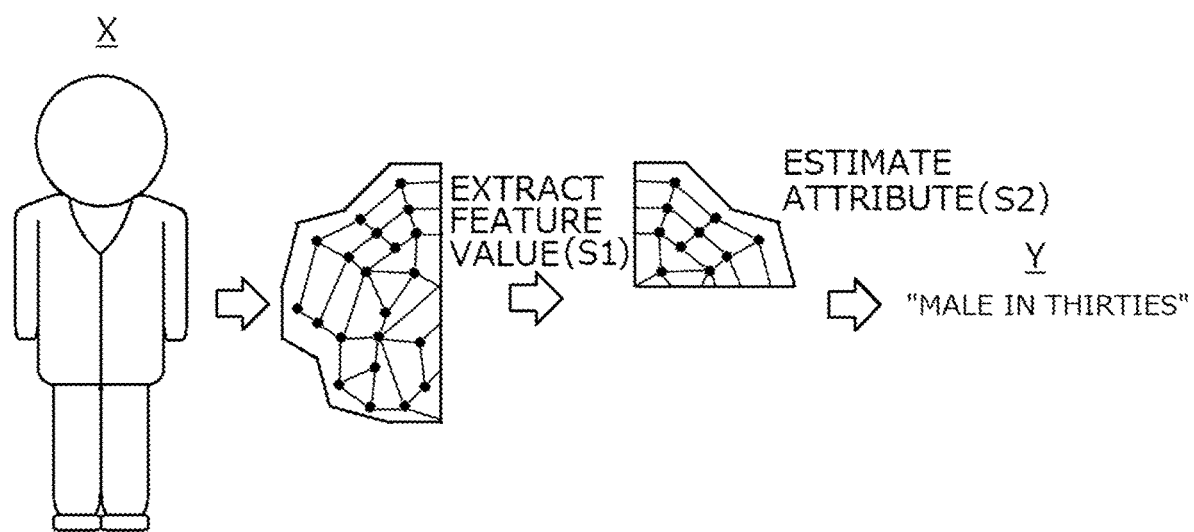
FIG. 2 is a drawing showing a process of analyzing the attribute of a sound source whose image has been captured by a camera.

FIG. 1 is a block diagram showing the block configuration of a sound generation apparatus 1 according to the present embodiment. FIG. 2 is a drawing showing a process of analyzing the attribute of a sound source whose image has been captured by a camera 20. The sound generation apparatus 1 according to the present embodiment will be described below with reference to the drawings.

As shown in FIG. 1, the sound generation apparatus 1 includes a microphone 10 serving as an example of sound collection means configured to collect a sound of a sound source in a space, a camera 20 serving as an example of image capture means configured to capture an image of the sound source, an image analysis unit 30 serving as an example of identification means configured to identify an attribute of the sound source from the image captured by the camera 20, a masking sound generation unit 40 serving as an example of sound generation means configured to obtain an acoustic characteristic of a target sound included in the sound collected by the microphone 10 and to generate multiple masking sounds on the basis of the acoustic char-acteristic and the attribute of the sound source identified by the image analysis unit 30, a display unit 50A serving as an example of display means configured to display the attribute of the sound source identified by the image analysis unit 30, a masking sound selection unit 50B serving as an example of sound selection means configured to receive selection of a masking sound from the masking sounds generated by the masking sound generation unit 40, and an sound output unit 60 serving as an example of sound output means configured to output the masking sound selected through the masking sound selection unit 50B. In the present embodiment, the sound generation apparatus 1 is implemented in a mobile terminal such as a smartphone, tablet, or mobile phone.

The microphone 10 collects the sound (a sound wave with an audible frequency) of the sound source, converts the sound into an audio signal as a converter, and transmits the audio signal to the masking sound generation unit 40. Examples of the sound source include apparatuses that emit a sound, humans who emit a voice, animals that make a call, road construction sites that make noise, and the like. The microphone 10 is not limited to a dynamic microphone, condenser microphone, or the like and may be of any type as long as it is able to collect the sound from the sound source. While the microphone 10 is not required to have particular directivity, it is preferably omnidirectional so that it is able to properly collect a sound reflected in a space.

The camera 20 is, for example, a digital camera including a charge-coupled device (CCD) image sensor or complementary metal-oxide-semiconductor (CMOS) image sensor and photoelectrically converts light entering the image sensor and acquires image information on the basis of the resulting electric charge. The method for transmitting an image captured by the camera 20 to the display unit 50A, the format of image signals (image coding method), or the like may be any method or the like.

The image analysis unit 30 estimates the attribute of the sound source by analyzing the image data transmitted from the camera 20. The analysis method may be a known method, and one example is to analyze the image by extracting features of the subject. The image analysis unit 30 includes a feature extraction module 301 that extracts the feature value of the captured image of a subject X, which is the sound source, and an analysis module 302 that estimates the attribute of the sound source using the feature value extracted by the feature extraction module 301.

Specifically, as shown in FIG. 2, in the image analysis unit 30, the feature extraction module 301 extracts the visual feature value of the image of the subject X (S1), and then the analysis module 302 estimates the attribute of the sound source using the visual feature value extracted by the feature extraction module 301 (S2) and outputs analysis results Y. For example, if the subject X is a human, the visual feature value is posture, clothing, facial expression, hair style, belongings, or the like and the attribute of the sound source include sex and age group. The subject is not limited to a human and may be a type of animal other than a human, an object such as an apparatus, vehicle, or robot that emits a sound, or a construction site. In an example shown in FIG. 2, the attribute of the inputted image X is estimated as "male in thirties."

The masking sound generation unit 40 generates an audio signal (hereafter referred to as a "masking sound signal") corresponding to a masking sound on the basis of the sound of the sound source (hereafter referred to as the "target sound") collected by the microphone 10. For example, the masking sound generation unit 40 analyzes the frequency characteristic of the target sound, which is one of the acoustic characteristics thereof, and generates a masking sound signal having a frequency characteristic similar to that of the target sound. Thus, a masking sound that is less likely to be unsuitable for the target sound is generated easily.

For example, the masking sound generation unit 40 may generate a masking sound signal by acquiring the spectral envelope of the target sound, vertically inverting this spectral envelope, for example, using the average amplitude as an axis, adding the phase spectral of the target sound to the inverted spectral envelope, and performing inverse Fourier transform. The masking sound signal thus generated is outputted as a masking sound through the sound output unit 60. Thus, even if the intensity of the masking sound is somewhat small, the target sound becomes less audible and high masking effects are obtained.

The masking sound generation unit 40 also generates a masking sound signal that makes (masks) the sound of the sound source less audible, on the basis of the attribute of the sound source estimated by the image analysis unit 30. For example, if the attribute of the sound source estimated by the image analysis unit 30 is "male in thirties," the masking sound generation unit 40 generates a masking sound signal having a frequency close to the frequency of the voice of a "male in thirties." If the attribute of the sound source is "a call of a dog," in particular, "a call of a large dog," the masking sound generation unit 40 generates a masking sound signal having a slightly lower frequency than the frequency range of a call of a common dog. If the attribute of the sound source is "noise from a nearby road construction site," the masking sound generation unit 40 generates a masking sound signal that is more likely to mask the noise from the road construction site.

Multiple masking sound signals each having a frequency close to the frequency of the attribute of the sound source may be generated so that masking sounds selectable by the user are increased. When generating a masking sound signal as described above, a parameter for calculating an audio signal corresponding to the attribute of the sound source may be acquired from outside.

The display unit 50A (see FIG. 4) and masking sound selection unit 50B (see FIG. 5) are combined into an operation/display unit 50 serving as a display for displaying information and an input device to which the user inputs various operations. The operation/display unit 50 may display the sound source using augmented reality (AR), virtual reality (VR), and/or mixed reality (MR). The operation/display unit 50 is formed by superimposing on each other a display 501 for displaying the image captured by the camera 20, icons for receiving selection of a masking sound from the masking sound based on the sound of the sound source and the one or more masking sounds based on the attribute of the sound source generated by the masking sound generation unit 40, and the like and a touchscreen 502 for detecting an touch operation by a user's finger or the like. The user of the sound generation apparatus 1 is able to check the image of the sound source captured by the camera 20 through the operation/display unit 50, as well as to select a masking sound from the masking sounds generated by the masking sound generation unit 40.

The sound output unit 60 is a speaker incorporated in the sound generation apparatus 1 and outputs the masking sound selected by the user. The sound output unit 60 may activate earphones or headphone available to the user.

(2) Operation of Sound Generation Apparatus

Figure 3:
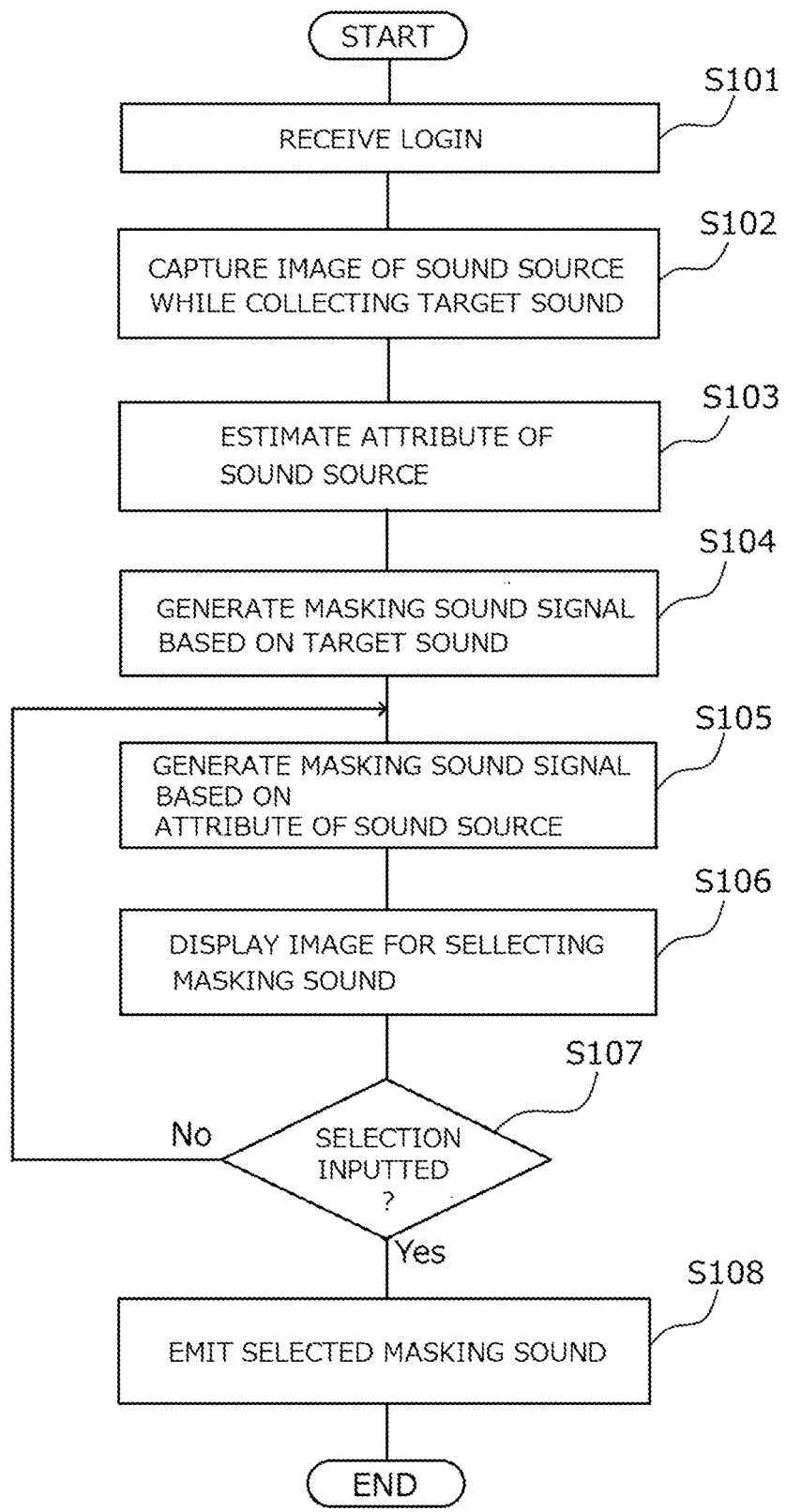
FIG. 3 is a flowchart showing a process until the sound generation apparatus according to the present embodiment outputs a masking sound.
Figure 4:
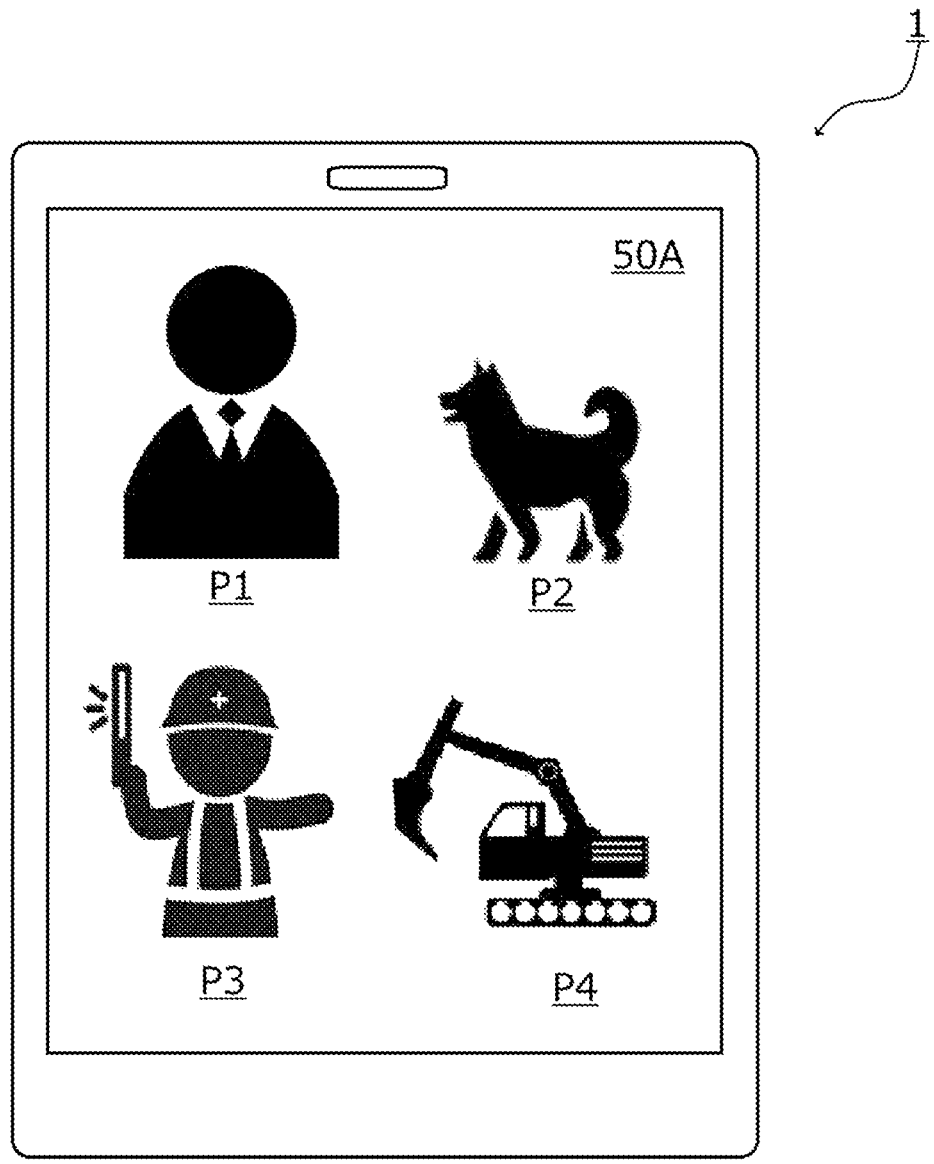
FIG. 4 is a drawing showing an example of the attribute of the sound source displayed on an operation/display unit.
Figure 5:
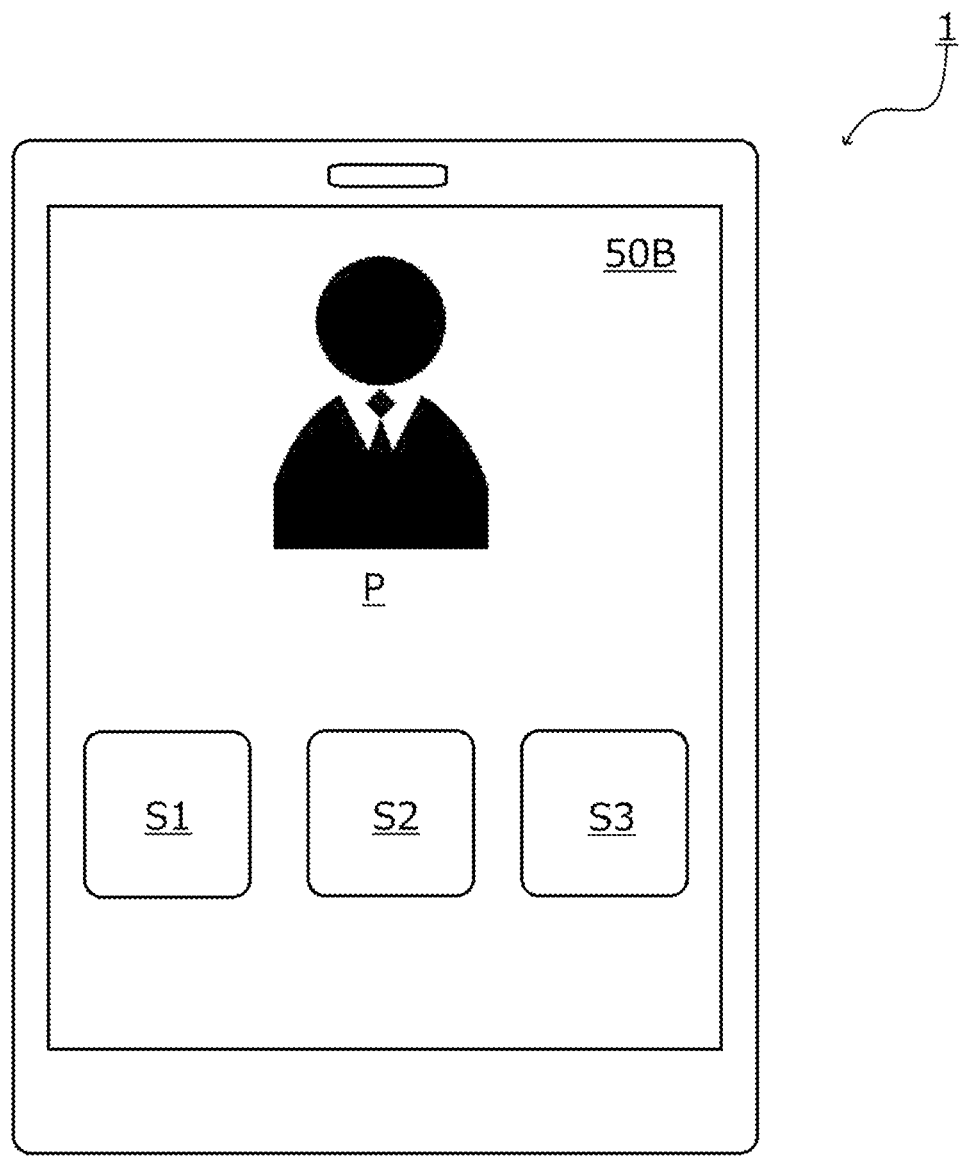
FIG. 5 is a drawing showing an example of a masking sound selection screen.

FIG. 3 is a flowchart showing a process until the sound generation apparatus 1 outputs a masking sound. FIG. 4 is a drawing showing examples of the attribute of the sound source displayed on the operation/display unit 50. FIG. 5 is a drawing showing an example of a masking sound selection screen. The operation of the sound generation apparatus 1 according to the present embodiment will be described below with reference to the drawings.

In step S101, the sound generation apparatus 1 receives login through the operation/display unit 50 (S101). In step S102, the sound generation apparatus 1 activates the camera 20 and captures an image of the sound source while collecting the target sound from the sound source using the microphone 10. For example, as shown in FIG. 4, the image data captured by the camera 20 is an image P1, P2, P3, P4, or the like representing the attribute of the sound source.

In step S103, the image analysis unit 30 analyzes the image data transmitted from the camera 20 and estimates the attribute of the sound source. The estimated attribute of the sound source is temporarily stored in the image analysis unit 30.

In step S104, the masking sound generation unit 40 generates a masking sound signal on the basis of the target sound from the sound source collected by the microphone 10 in step S102.

In step S105, the masking sound generation unit 40 generates a masking sound signal on the basis of the attribute of the sound source estimated by the image analysis unit 30 in S103. The masking sound generation unit 40 may generate multiple masking sound signals each having a frequency close to the frequency of the attribute of the sound source. Thus, the user is able to select a masking sound from the masking sound generated on the basis of the target sound collected by the microphone 10 and the masking sound(s) generated on the basis of the image data captured by the camera 20.

In step S106, images for selecting a masking sound are displayed on the operation/display unit 50. For example, as shown in FIG. 5, an image P of the sound source and icons S1, S2, and S3 indicating masking sounds among which the user selects, and the like are displayed. The image P may be displayed using mixed reality (MR) including augmented reality (AR), virtual reality (VR), a hologram, or the like, which can display the sound source more properly.

Then, in step S107, the operation/display unit 50 determines whether it has received input for selection of a masking sound by the user. If the operation/display unit 50 determines that it has received input for selection of a masking sound by the user (S107: Yes), the sound output unit 60, in step S108, emits the selected masking sound by activating the speaker 601. If input for selection is not identified (S107: No), the process returns to step S105 and the masking sound generation unit 40 again generates a masking sound signal(s) on the basis of the attribute of the sound source estimated by the image analysis unit 30. Thus, the user of the sound generation apparatus 1 is able to use a masking sound most suitable for the particular sound source in the space.

MODIFICATION

Figure 6:
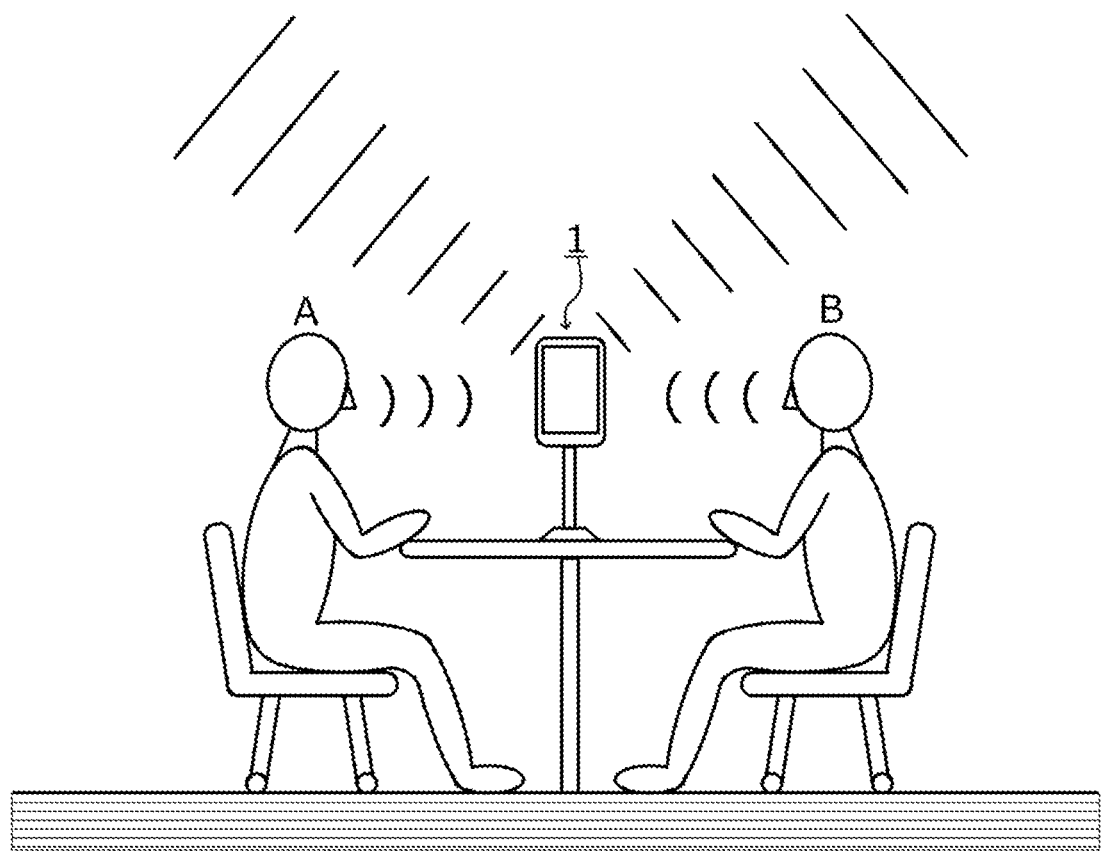
FIG. 6 is a drawing showing an example of a situation in which a sound generation apparatus according to a modification is being used.
Figure 7:
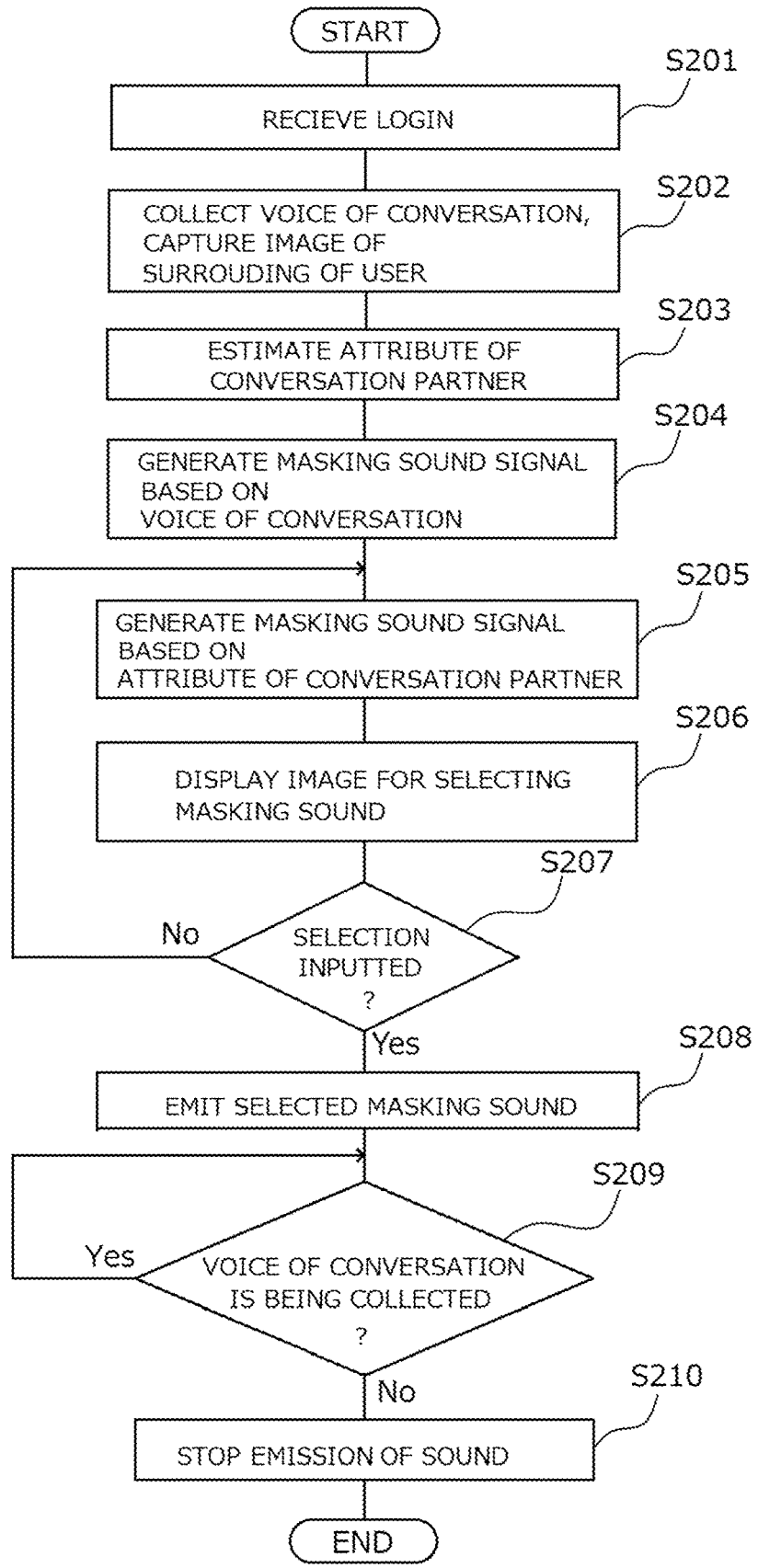
FIG. 7 is a flowchart showing a process until the sound generation apparatus according to the modification outputs a masking sound.

FIG. 6 is a drawing showing an example of a situation in which a sound generation apparatus 1 according to a modification is being used. FIG. 7 is a flowchart showing a process until the sound generation apparatus 1 according to the modification outputs a masking sound. When the sound generation apparatus 1 according to the modification is directed to the conversation partner B of the user A of the sound generation apparatus 1 as shown in FIG. 6, the sound generation apparatus 1 collects the voice of the conversation of the user using a microphone 10 (see FIG. 1), as well as captures an image of the surroundings of the user including the user using a camera 20 (see FIG. 1). The sound generation apparatus 1 is configured to allow the user to select a masking sound that makes it difficult to grasp the content of the conversation of the user from outside and to emit the selected masking sound from a speaker 601 (see FIG. 1).

In step S201, the sound generation apparatus 1 receives login through an operation/display unit 50. In step S202, the sound generation apparatus 1 starts the camera 20 and captures an image of the surroundings of the user while collecting the voice of the conversation of the user using the microphone 10. For example, the captured image data includes images of the user and the conversation partner of the user.

In step S203, an image analysis unit 30 estimates the attribute of the conversation partner of the user by analyzing the image data. The estimated attribute of the conversation partner is temporarily stored in the image analysis unit 30.

In step S204, a masking sound generation unit 40 generates a masking sound signal on the basis of the voice of the conversation of the user collected by the microphone 10.

In step S205, the masking sound generation unit 40 generates a masking sound signal on the basis of the attribute of the conversation partner estimated by the image analysis unit 30. The attribute of the conversation partner is sex and age group. This masking sound signal is a masking sound signal having a frequency close to the frequency of an audio signal of a human representing the sex and age group of the conversation partner. Thus, the user is able to select a masking sound between the masking sound generated on the basis of the voice of the conversation of the user collected by the microphone 10 and the masking sound generated on the basis of the image data captured by the camera 20.

In step S106, images for selecting a masking sound are displayed on the operation/display unit 50. In step S207, the operation/display unit 50 determines whether it has received input for selection of a masking sound by the user (S207).

If the operation/display unit 50 determines that it has received input for selection of a masking sound by the user (S207: Yes), the sound output unit 60, in step S208, emits the selected masking sound by activating the speaker 601. Then, in step S209, the sound output unit 60 determines whether the voice of the conversation of the user is being collected by the microphone 10 (S209). If the voice is not being collected (S209: No), the sound output unit 60 stops the emission of the sound from the speaker 601 in S210. That is, the sound generation apparatus 1 emits a masking sound in response only when the user is having a conversation. If input for selection is not identified (S207: No), the process returns to step S205 and the masking sound generation unit 40 again generates a masking sound signal on the basis of the attribute of the conversation partner estimated by the image analysis unit 30 (S205).

As seen above, the user of the sound generation apparatus 1 uses the sound generation apparatus 1 while having a conversation with two or more persons, and the sound generation apparatus 1 allows the user to select a masking sound that makes it difficult to grasp the content of the conversation of the user from outside and emits the selected masking sound from the speaker 601. Thus, the content of the conversation becomes less audible to others.

What is claimed is:

1. A sound generation apparatus comprising:
    sound collection means configured to collect a sound of a sound source in a space;
    image capture means configured to capture an image of the sound source;
    estimation means configured to estimate an attribute of the sound source from the image captured by the image capture means;
    sound generation means configured to obtain an acoustic characteristic of a target sound included in the sound collected by the sound collection means and to generate a plurality of masking sounds on the basis of the acoustic characteristic and the attribute of the sound source estimated by the estimation means;
    display means configured to display the attribute of the sound source estimated by the estimation means;
    sound selection means configured to receive a selection of a masking sound from the masking sounds generated by the sound generation means; and
    sound output means configured to output the selected masking sound.

2. The sound generation apparatus of claim 1, wherein the sound generation means analyzes an acoustic characteristic of the sound of the sound source collected by the sound collection means and generates a masking sound having an acoustic characteristic similar to the acoustic characteristic of the sound of the sound source.

3. The sound generation apparatus of claim 1, wherein the sound generation means generates a masking sound having an acoustic characteristic similar to an acoustic characteristic of the attribute of the sound source estimated by the estimation means.

4. The sound generation apparatus of claim 3, wherein the sound generation means generates a plurality of masking sounds each having an acoustic characteristic similar to the acoustic characteristic of the attribute of the sound source.

5. The sound generation apparatus of claim 1, wherein the sound selection means displays the attribute of the sound source estimated by the estimation means and receives the selection of the masking sound.

6. The sound generation apparatus of claim 5, wherein the display means displays the sound source using mixed reality including virtual reality, augmented reality, or a hologram.

7. The sound generation apparatus of claim 1, wherein the sound collection means is an omnidirectional microphone.

8. The sound generation apparatus of claim 1, wherein the sound of the sound source in the space is a voice of a conversation of a user using the sound generation apparatus.

9. The sound generation apparatus of claim 8, wherein the sound output means outputs the masking sound as long as the sound collection means is collecting the sound of the sound source.

10. The sound generation apparatus of claim 2, wherein the sound of the sound source in the space is a voice of a conversation of a user using the sound generation apparatus.

11. The sound generation apparatus of claim 10, wherein the sound output means outputs the masking sound as long as the sound collection means is collecting the sound of the sound source.

* * * * *